July 6, 1926.
F. M. OEDER
OIL GAUGE
Filed Feb. 14, 1922
1,591,544
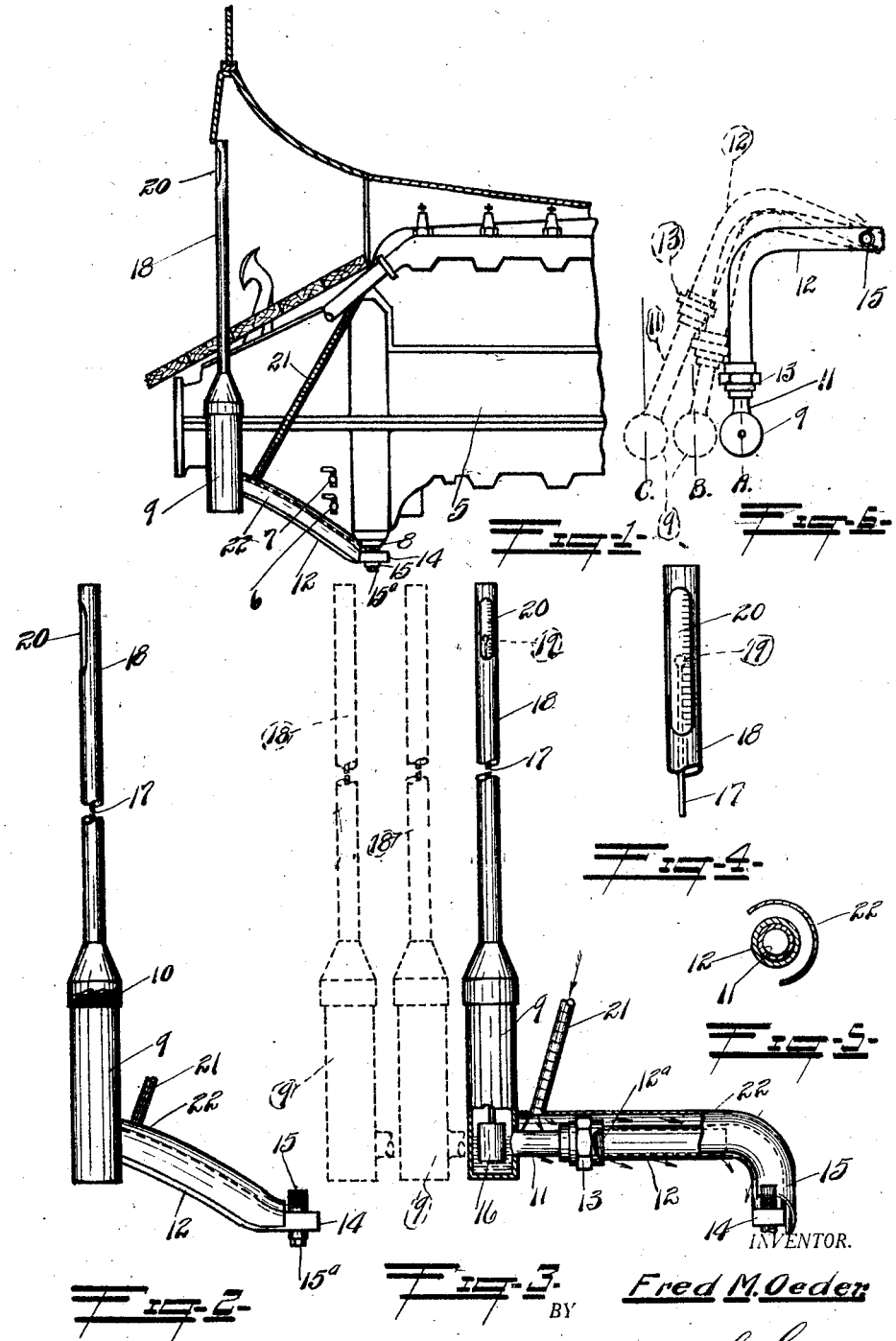
INVENTOR.
Fred M. Oeder
BY
Frank C. Farman
ATTORNEY.

Patented July 6, 1926.

1,591,544

UNITED STATES PATENT OFFICE.

FRED M. OEDER, OF BAY CITY, MICHIGAN, ASSIGNOR OF ONE-FOURTH TO WILLIAM HAMMERBACKER, OF BAY CITY, MICHIGAN.

OIL GAUGE.

Application filed February 14, 1922. Serial No. 536,413.

This invention relates to oil gauges and the like and is designed as an improvement on my original application for Letters Patent filed by me on December 19th, 1921, Serial No. 523,318, and relating to the same subject matter.

This improved oil gauge is designed to be used on Ford automobiles, and in practice I find that in order that the one size structure may be adapted to all types of bodies such as sedans, trucks and touring cars, it must be made adjustable, as the distance between the drain plug connection and the instrument boards of the different types of bodies enumerated varies considerably. It is also necessary that the connection to the drain plug fit snugly against and hug the clutch housing, so that it will not be struck by upstanding projections in the road over which it may travel.

The prime object of the invention is to provide a simple oil gauge which can be readily attached to any Ford automobile, so that the oil level in the engine can be accurately determined without leaving the driver's seat.

Another object of the invention is to provide a simple and durable device, light in weight which can be formed of tubing thus enabling the structure to be constructed at a minimum cost.

A further object is to provide an oil gauge which will accurately register the oil level and which will be provided with means for heating the device in cold weather.

The above and other objects will appear as the specification progresses, reference being had to the accompanying drawing in which I have shown the preferred embodiment of my invention, and in which like numerals indicate like parts throughout the several views thereof.

In the drawing:—

Fig. 1 is a fragmentary view of an internal combustion engine as used in a Ford automobile and illustrating my improved oil gauge attached thereto.

Fig. 2 is an enlarged side view thereof.

Fig. 3 is a part sectional front view illustrating the float well in different positions to accommodate the different types of bodies, and looking from the front of the engine.

Fig. 4 is an enlarged fragmentary view of the vertical tube illustrating the indicating means.

Fig. 5 is a cross sectional view taken on the line 5—5 of Fig. 3.

Fig. 6 is a top plan view of the device, illustrating the float well in different positions to suit different types of bodies.

One disadvantage of the Ford automobile is that the driver can not see and has no means of determining the oil level in the engine while seated in the car, it is of course essential that sufficient oil be kept in the engine to properly circulate and lubricate the different moving parts, otherwise serious damage results. At present it is necessary to leave the seat, kneel on the ground and open the test cocks which are located in spaced relation on the crank case of the engine, and if the oil level be between the two cocks the oil must be drained until it is level with the lower cock, then the additional volume is added. In practice it is recommended that this oil level be maintained somewhere between these two cocks, because if the level be too high, the oil is carried up into the cylinders on top of the pistons fouling the spark plugs, etc. With my improved oil gauge, the oil level is accurately registered, and the oil pre-heated to insure it being of the proper consistency to circulate.

Referring now particularly to the drawing, the numeral 5 indicates the crank case of the engine, which is provided with the test cocks 6 and 7 located in spaced relation on the side thereof, a drain plug 8 being located at the lowest point, and to which I connect my improved oil gauge. My improved gauge comprises a well 9 which I prefer to make cylindrical in form, the upper end being threaded as shown at 10, and to which the vertically disposed pipe 18 is connected. A laterally projecting pipe 11 is formed integral with the member 9, and is adapted to be inserted in a similar pipe 12 which is of sufficient diameter to receive it. The members 11 and 12 are slidably secured together by means of the coupling 13, one end of which is threaded to engage the threaded end 12$^a$ of the pipe 12, the opposite end containing a suitable wick or packing for forming an oil tight joint thereat, but which will however admit of positioning the well 9 as indicated by the dotted lines in Figs. 3 and 6, this oil tight joint can be made up in several different ways, and I do not wish to be limited to any one specific way of doing it.

The free end of this member 12 is bent downwardly and at right angles to the main body, the end 14 being flattened as shown and is threaded to receive a nipple 15 which extends through it. One end of the nipple is threaded into the drain plug opening, while the opposite end is internally threaded to receive a plug 15$^a$ for draining the oil from the engine and oil well when desired.

A float 16 is loosely housed in the well 9, and is preferably formed of cork to which the vertically extending stem or rod 17 is connected, and it will be noted that the bottom of the well is slightly below the lateral extension 11, in order that there will always be sufficient oil in the well to support the float.

The stem 17 extends upwardly through the tubing 18, the lower end of said tubing being threaded to engage the similarly threaded upper end of the well 9. The top of the stem is provided with a small ball 19 which is preferably painted white in order that it may be clearly distinguished. A graduated glass 20 being set in the upper end of this tube 18 as shown, and it will be obvious that as the oil in the crank case raises or lowers, the oil level will always be accurately recorded in this glass.

In cold weather the oil becomes stiff after the motor has stood for a period of time, also condensation from the cylinders mixes a little water with it, and this freezes and prevents circulation. I overcome this by attaching a flexible hose 21 to the exhaust pipe of the engine, a lip (not shown) extending into the path of the exhausted gases and diverting a portion of these gases to the chamber formed by the sheet metal member 22 which embraces the members 11 and 12. This member can be formed to entirely surround the members if desired, but I prefer to make it as shown, as it provides sufficient heat to lower the viscosity of the oil and can be readily and cheaply formed, the angle of the member 12 preventing it from turning thereon.

The device is supported by connection to the drain plug. The oil well 9 is also secured to the vehicle frame when installed.

In Fig. 5 I have shown the oil well in different positions, and have indicated the relative positions of the instrument boards on the different types of bodies, A indicating the location of the instrument board of a touring car, B the instrument board of a truck, while C indicates the position of the instrument board of a sedan.

From the foregoing description it will be obvious that I have perfected a simple and durable adjustable oil gauge, which can be adjusted to fit any type of Ford automobile.

What I claim is:—

An oil gauge adapted to be attached to the drain plug opening in the crank case of a Ford or other automobile engine and comprising a reservoir, a float therein, a right angled longitudinally extendible connection between the reservoir and the drain plug opening, a nipple extending through said connection at its lower end and adapted to be threaded into the drain plug opening beneath the engine, and a plug in the lower end of said nipple for draining said crankcase and reservoir.

In testimony whereof I affix my signature.

FRED M. OEDER.